Dec. 21, 1937.                R. E. BRIGGS                2,102,990
                       MATERIAL TREATING APPARATUS
                       Filed Dec. 8, 1933       3 Sheets-Sheet 1
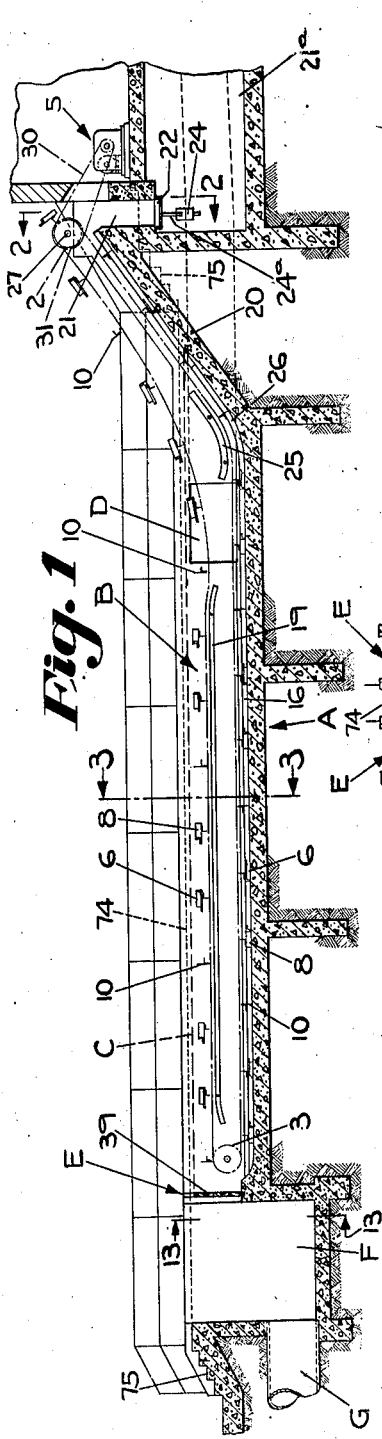
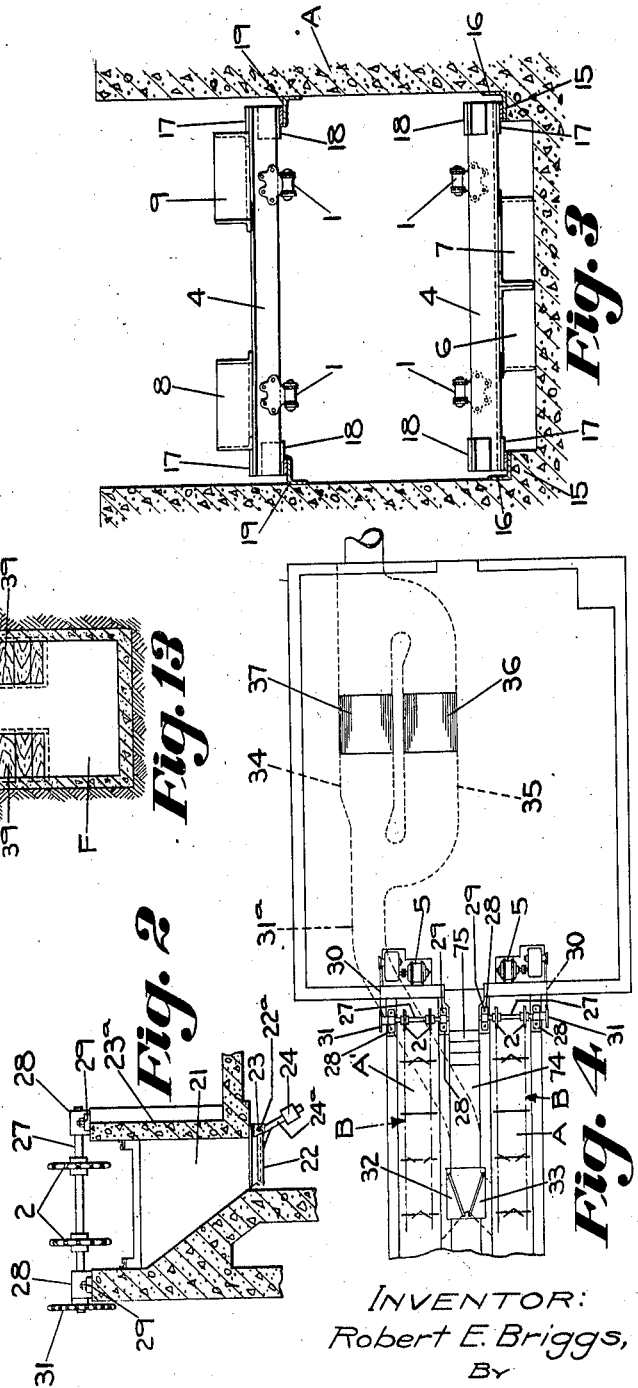
INVENTOR:
Robert E. Briggs,
By
Chas. M. Nissen,
ATT'Y.

Dec. 21, 1937. R. E. BRIGGS 2,102,990
MATERIAL TREATING APPARATUS
Filed Dec. 8, 1933 3 Sheets-Sheet 2
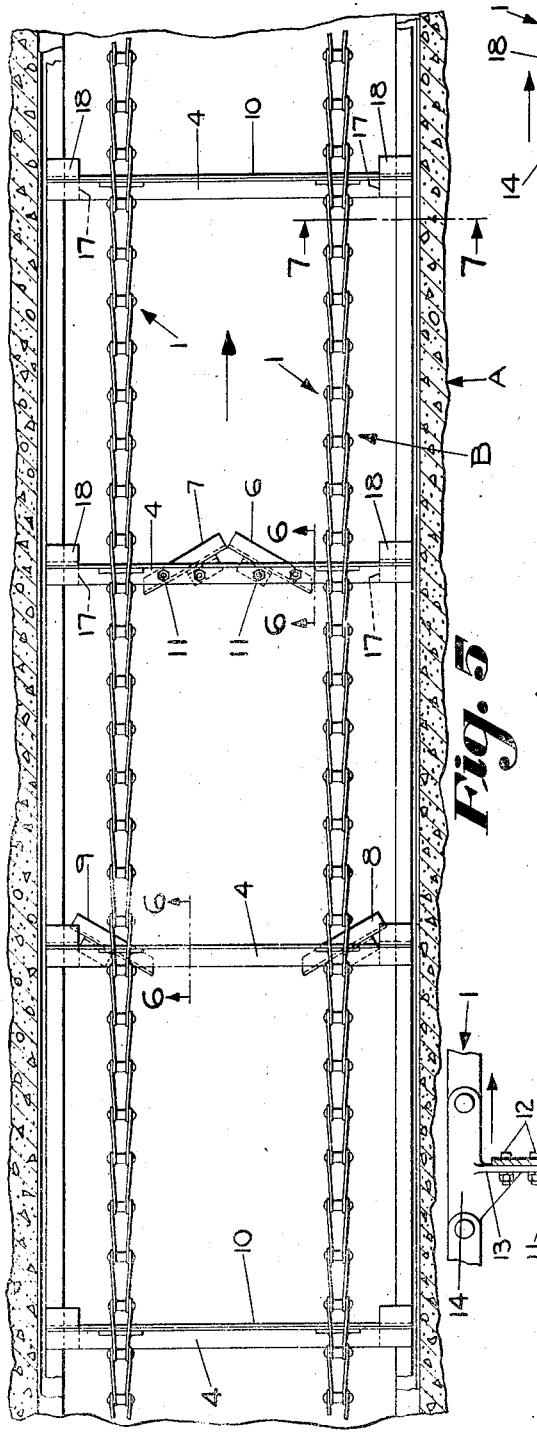
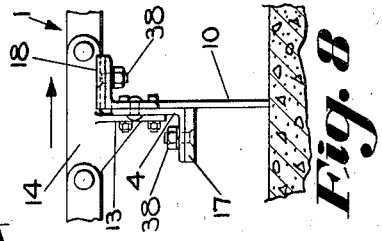
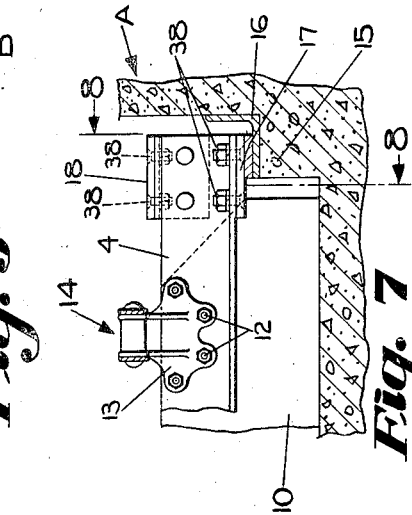
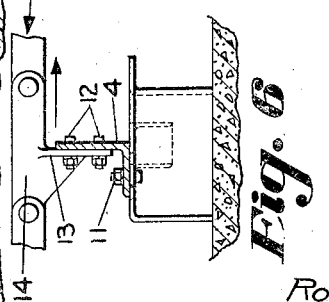
INVENTOR:
Robert E. Briggs
BY
Chas. M. Niesen,
ATTY.

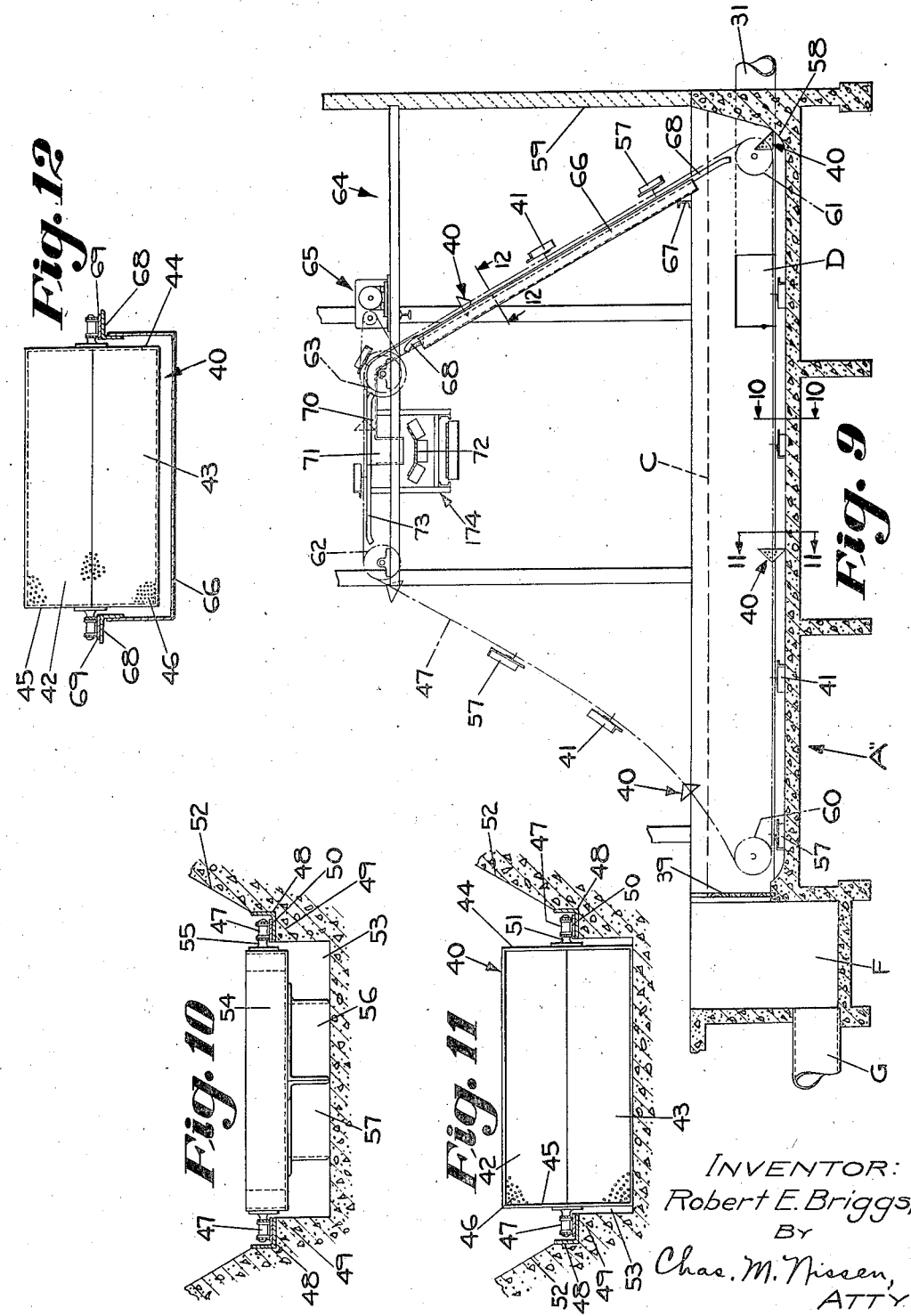

Patented Dec. 21, 1937

2,102,990

UNITED STATES PATENT OFFICE 2,102,990

MATERIAL TREATING APPARATUS

Robert E. Briggs, Columbus, Ohio, assignor to The Jeffrey Manufacturing Company, a corporation of Ohio Application December 8, 1933, Serial No. 701,550

15 Claims. (Cl. 210—3)

In installations for treating and disposing of sewage, it is desirable to remove from the liquid, entrained coarse materials and solids of high specific gravity before the sewage is passed to the sedimentation tanks in which the suspended putrescible solids are allowed to settle.

Thus, for example, it is desirable to settle out from the liquid heavy materials such as sand, gravel, cinders and the like, which materials are washed into sewer drains from streets during periods of storm, and become commingled with the sewage; and since for economical reasons it is desirable to transmit these materials without substantial additional treatment directly to disposal, it is necessary that all entrained putrescible material be freed therefrom before the heavy materials or "grit" are removed from the grit tanks.

One object of the present invention is to provide an improved type of conveying mechanism especially adapted to be installed in the grit tank of a sewage disposal system, so that the deposited grit may be freely agitated and freed from entrained solids and sediment of a putrescible character.

A further object of the invention is to provide a conveyor, operable in a grit tank, which embraces features facilitating the discharge from the tank of the materials deposited in the tank.

Another object of the invention is to provide an improved form of tank itself for use in connection with the improved conveyor construction, in combination with improved influent means designed to increase the efficiency of installations of this character.

Other objects of the invention will appear hereinafter, the novel features and combinations being set forth in the appended claims.

In the accompanying drawings:

Fig. 1 is a diagrammatic longitudinal section through one form of a grit tank used in sewage treating operations embracing certain of the improvements of the present construction;

Fig. 2 is a transverse sectional view taken on the line 2—2 of Fig. 1, looking in the direction of the arrows;

Fig. 3 is a transverse sectional view of the tank of Fig. 1 taken on the line 3—3 of Fig. 1, looking in the direction of the arrows;

Fig. 4 is a plan view of the influent end of the tank of Fig. 1, showing the path taken by the influent liquid;

Fig. 5 is a fragmentary plan view of the tank of Fig. 1, showing details of one form of conveyor utilizable in connection with this invention;

Fig. 6 is a sectional view on either line 6—6 of Fig. 5, looking in the direction of the arrows;

Fig. 7 is a view taken on the line 7—7 of Fig. 5, looking in the direction of the arrows;

Fig. 8 is a view taken on the line 8—8 of Fig. 7, looking in the direction of the arrows;

Fig. 9 is a longitudinal sectional view through a somewhat different form of tank and conveyor from that shown in the preceding views;

Fig. 10 is a sectional view taken on the line 10—10 of Fig. 9 looking in the direction of the arrows and showing a different mounting for the conveyor flights;

Fig. 11 is a sectional view on the line 11—11 of Fig. 9, looking in the direction of the arrows, and showing the mounting of a V-bucket employed on the conveyor;

Fig. 12 is a sectional view taken on the line 12—12 of Fig. 9, looking in the direction of the arrows; and Fig. 13 is a view taken on the line 13—13 of Fig. 1 looking in the direction of the arrows.

Referring more particularly to the drawings in the installation illustrated by Figs. 1 to 8, inclusive, A represents a tank, which may be a grit tank used in sewage disposal installations, provided with a conveyor B and receiving influent liquid through intake D, effluent passing from the tank through outlet E.

Where the tank A is used as a grit tank in sewage disposal instrumentalities, influent liquid entering the tank A carries along with it many kinds of putrescible organic materials, together with unalterable heavy inorganic solids, such as cinders, sand, gravel, and the like, which are deposited in the tank A by the reduction in velocity of the fluid stream incident to its issuance from intake D.

The present invention relates to improved apparatus for handling this heavy inorganic material, and for freeing it from entrained putrescible organic substances which, when thus freed, are carried by the effluent liquid into the sedimentation tanks.

In order to promote the separation of putrescible matter from the deposited grit, and to remove the latter in an expeditious manner, the conveyor B is provided.

The conveyor B includes endless spaced conveyor chains 1, passing over guide sprockets 2 and 3 and joined in proper spaced relation by transversely extending angles 4 on which the conveyor flights are mounted. Drive mechanism 5 is provided for operating the conveyor chains in the direction opposite to the direction of flow of the fluid current through the tank, so that the conveyor flights will not be required to push the deposited grit an excessively far distance to discharge the same from the tank, and so that when the inorganic material settles it will be washed clean by separation of organic material therefrom.

For freeing the deposited grit from entrained putrescible substances, the grit must be thoroughly agitated so that the said substances may be washed out by the flowing liquid. This agitation is accomplished by the flights of the conveyor.

The flights are so arranged that maximum stirring action is obtained on the deposited grit. The flight members are indicated at 6, 7, 8, 9 and 10, and they may be disposed along the chain at whatever frequency desired. The flights are secured to the angles 4 by any suitable means, such as by bolts 11, the angles 4 being bolted by bolts 12 to depending brackets or lugs 13 of links 14 of the chains 1.

From Fig. 5, especially, it will be seen that the pair of flights 6 and 7 are angularly disposed relatively to the supporting angles 4 and are positioned so as to converge substantially together on the center line of the tank in the direction of travel of the conveyor. Flights 8 and 9 are positioned adjacent the ends of their angles 4, and are angularly disposed relatively to their supporting angle 4, but they are arranged in a diverging relationship relative to the direction of travel of the conveyor. The paths of travel of the pairs of flights 6 and 7, and 8 and 9, overlap, however; and flight 6 is mounted substantially parallel with flight 9 and flight 7 is substantially parallel with flight 8. Flights 6 and 9 are interchangeable, as are flights 7 and 8, and the flights 6, 7, 8 and 9 are of substantially the same length and shape.

From the disposition of these flights, it will be seen that as the flights 6 and 7 pass through the deposited grit they plow the grit outwardly towards the sides of the tank A, turning over the particles of grit during this action. Flights 8 and 9 then come along and re-gather the grit spread by the flights 6 and 7, and move the grit inwardly from the walls towards the middle of the tank, effecting a further and complete agitation of the grit. Straight flights 10 scrape the grit straight along the bottom of the tank to discharge.

It will be seen, also, that the side walls of the tank A are provided with longitudinally extending ledges or shoulders 15 on which are mounted the angles 16 of hardened steel or the like, which form tracks along which travel the ends of the flight supporting angles 4. The angles 4 are provided at each end on the top and bottom surfaces of the angles with renewable wear plates or shoes 17 and 18, the shoes 17 engaging the angles 16 at the bottom of the tank, and the shoes 18 engaging the angles 19 which are suitably secured to the walls of tank A to support the conveyor in the course of its upper run along its horizontal travel.

Additionally, it will be observed that in order to facilitate the discharge of the grit, the tank A has its end inclined at 20, the conveyor working the grit up the incline and into the well 21 provided with a bottom closure gate 22, operable upon accumulation of a predetermined amount of grit in the well 21 to allow the accumulated grit to drop into compartment 21a whence it may be removed by a cross conveyor, not shown, or by any other suitable means. The gate 22 is hinged at 23 to a lug 22a depending from the wall 23a, and is provided with a downwardly extending inclined arm 24a, on which is adjustably mounted a counterweight 24 which maintains the gate 22 normally closed. The counterweight 24 may be moved along arm 24a for adjusting the weight which the gate 22 will sustain. In order to guide the conveyor flights up the incline 20, inclined angles 25 are secured to the walls of the tank vertically above the angles 16 and adjacent to the rounded corner 26 of the tank bottom which marks the beginning of the inclined end portion of the tank, the angles 25 holding down the flights against the tank bottom as they move up the incline 20. The drive sprockets 2 for the conveyor chain are mounted on shaft 27 journalled in bearings 28, bolted at 29 to the top of the inclined end 20 of the tank. Power is transmitted to the shaft 27 from the driving mechanism 5 through sprocket chain 30 operating drive sprocket 31.

The intake opening D for the influent is located in the side wall of the tank A just behind the inclined end 20. As will be seen from Fig. 4, it is convenient to provide two tanks A and A' of like construction and spaced apart, served by a common intake conduit 31a, which branches at 32 and 33 to the respective openings D in the side walls of the tank. The lateral introduction of the influent serves to break the velocity of the currents and facilitates the depositing of the grit adjacent the influent ends of the tanks so as to prevent an undue length of travel of the grit through the tank. The conduit 31a is branched at 34 and 35 and in these branches are illustrated screens 36 and 37 which remove coarsest materials from the influent before the settling tanks are reached.

Bolts 38 secure the wear plates 17, 18, to the flight supporting angles 4, so that these wear plates may be readily replaced whenever desired.

The rate of flow of the liquid through each tank is controlled by weirs 39 positioned adjacent the effluent ends of the tanks A, A'. Each weir is of suitable height to maintain the desired liquid level in the tank, and is removable to enable the tank to be dewatered, or drained, when desired.

It may be mentioned at this point that at least two tanks A and A' are provided to accommodate the increased flow of liquid during storm conditions, where one tank will not be sufficient to handle the volume; although under normal conditions, only one of the tanks need be operated at a given time.

In the modified form of installation shown in Figs. 9 to 12 inclusive, one or more V-buckets may be employed in the conveyor system. These buckets, as their designation implies, are substantially V-shaped in cross-section, and are adapted to extend across the bottom of the tank to collect the deposited grit, as the conveyor moves along. These buckets replace the straight flights 10 of the previously described conveyor. These V-buckets, indicated generally at 40, comprise the converging side walls 42 and 43 and end walls 44 and 45. The walls of each receptacle are perforated, as indicated at 46, to allow drainage of liquid. The spaced conveyor chains 47 run along the sides of the tank, as clearly shown in Figs. 10 and 11, the angles 48, forming tracks along which the conveyor travels, being mounted on longitudinal shoulders or ledges 49 formed in the walls of the tank a suitable distance above the bottom thereof. Wear plates 50 of relatively soft material, and readily removably mounted on the angles 48, take the direct engagement of the chains 47. The ends of the V-buckets are secured to the conveyor chains through suitable brackets or the like, 51. The walls of the tank may be vertical, or may be upwardly diverging from the angles 48, as indicated at 52, such inclined sides guiding the settling grit into the trough-portion 53 of the tank, in which trough portion the conveyor operates, thus enabling shorter V-buckets and shorter conveyor flights to be used than when the tank walls are vertical.

Flight supporting angles 54 corresponding to angles 4 of the previously described modification, are attached at their ends to the conveyor chains by attaching brackets 55, and carry the flights 56 and 57, corresponding to flights 6 and 7 above described, and which likewise converge to the center line of the tank, in the direction of travel of the conveyor chains. Flights 41 corresponding to flights 8 and 9 are also employed so that, in this second form of conveyor, there is the same agitation and outward and inward movement of the deposited grit as was accomplished in the previously described form. The corner 58 of the tank is rounded, and is adapted to be engaged by the V-buckets previously described so as to enable collected grit to be removed, but the inclined end 20 of the previously described form is replaced by a substantially vertical end wall 59.

Guide sprockets 60 and 61 are positioned in the bottom of the tank A", the conveyor passing over the upper sprockets 62 and 63 mounted on framework 64, sprockets 63 being the drive sprockets operable from the drive mechanism 65.

As the V-buckets 40 move up the inclined path of the conveyor, the liquid draining through the apertures 46 is guided back into the tank A" by the provision of a drip trough 66, supported partly on a channel 67 mounted on the tank, and partly on the frame 64. The trough 66 is provided with angles 68 carrying renewable wear plates 69, along which the conveyor chains 47 run.

As the buckets 40 pass over the driving sprockets 63, they are tilted to discharging position, dumping their contents into a trough 70 provided with the discharge opening 71, the buckets pushing the grit through opening 71 onto a conveyor or other disposal means 72 for removal. Angles 73 support the conveyor in its horizontal travel along trough 70, the angles 73 being carried on the frame 174 which supports the conveyor 72.

As indicated in Fig. 9, the buckets 40 assume a position incident to their rounding the sprockets 60, such that their open faces come into contact with the grit and load by virtue of the resistance of the deposit to the movement of the buckets. The engagement of the buckets with the rounded corner 58 of the tank as the buckets turn on the sprockets 61, tends to pack the thoroughly washed grit or inorganic granular materials into the buckets.

As in the previously described modification the influent enters the tank A" laterally and angularly toward the effluent end of the tank, through the intake opening D in the side wall of the tank. The weir 39 controls the depth of the liquid so that its upper surface will be at the level indicated at C in Fig. 9.

It will be evident that when the tanks are installed in pairs as shown in Fig. 4, and only one tank is in operation, suitable means (not shown) for stopping the flow of influent through whichever intake D opens into the tank not in use, may be provided.

The space 74 between the tanks may serve as a walkway for facilitating inspection of the tanks, steps 75 leading to the walkway.

It should be observed that the diagonal flights 6, 7, 8 and 9 exert a thorough washing action on the inorganic granular materials deposited at the bottom of the tank and that they are not intended as conveying flights except to deflect or spread the materials. The longitudinal transfer of the deposited materials along the tanks is accomplished by means of the transverse straight flights 10 in the form shown in Fig. 1 and by means of the transverse buckets 40 in the form shown in Fig. 9. In a similar manner the diagonal flights 56, 57, 41 shown in Figs. 9 and 10 are not relied on to act as conveying flights except to spread or deflect the materials deposited at the bottom of the tank to thoroughly wash them entirely free of organic materials.

It is also worthy of note that the separation of the putrescible organic substances from the inorganic grit is carried out entirely beneath the surface of the liquid in the tank so that when the transverse conveyor flights 10 scrape the grit upwardly along the inclined bed 20 it has been thoroughly cleaned of organic material before the grit emerges from the surface of the liquid in the tank. The organic substances being of relatively light specific gravity, are buoyed up by the liquid and floated off therewith toward the effluent end of the tank, as soon as such organic substances become freed from the grit by the thorough stirring action by means of the diagonal flights at the horizontal surface at the bottom of the tank. In other words, the buoyancy of the organic materials effects a complete separation thereof from the inorganic grit as the latter is repeatedly stirred and agitated by the action of the diagonal flights at the bottom of the tank.

At the forward end of the conduit 31ª the branch conduits 32 and 33 are directed diagonally toward the effluent ends of the tanks and the mixture enters the side openings D at decreased velocity but with a flow toward the effluent ends of the tanks, thereby assuring sedimentation of the inorganic materials at a sufficient distance from the inclined bed 20 to assure a thorough washing action of the grit before it emerges from the surface C of the liquid. The current of the liquid in the tank toward the effluent end is kept from becoming quiescent at any portion of the tank by the transverse cross flights 10 moving downwardly and entering the liquid in the tank immediately above the guides 25 as shown in Fig. 1. When the surface level C is sufficiently low the flights 10 moving toward the effluent end of the tank will also facilitate the removal of the organic materials from the tank by a skimming action.

Each weir 39 may be a baffle gate or wall for maintaining a predetermined liquid level C in the tank so as to maintain the intake opening D continuously submerged. The velocity of the influent from the conduit 31ª into either tank is reduced incident to its discharge into such tank so that sufficiently rapid deposition of heavy inorganic solids will take place before the effluent end of the tank is reached. The height of the effluent weir 39 is such that the liquid level C maintains the opening D continuously submerged, the influent flowing through the conduit 31ᵃ under sufficient hydraulic head to prevent substantial settling of the grit in this conduit. As soon as the grit enters the tank A with the influent, it begins to be deposited at the bottom of the tank because of the reduced velocity of flow of fluid in the tank. Such reduction in velocity is effected not only by change of direction of the influent through the side openings D but also because of the increased areas of the tanks relative to the diameter of the conduit 31ᵃ, coupled with the retarding action of the effluent weirs 39. It will thus be seen that the arrangement is such that sedimentation of the grit is effected in a body of liquid which is always in motion through it so that the inorganic substances will be continually moving toward the effluent end of the tank, and before the deposited grit emerges from the body of the liquid it has been thoroughly agitated to entirely remove therefrom all organic substances. There will therefore be no accumulation of any deposited grit in any portion of the tank nor any accumulation of any organic substances, since the cleaned grit is continually being moved along the inclined bed 20 to the well or hopper 21 and the liquid having the organic substances in suspension therein is being continually moved toward the effluent end of the tank.

The effluent from the tank A flows into the well F from which it flows through the pipe G to the tanks where the lighter putrescible organic materials are separated by sedimentation.

Fig. 13 illustrates that each weir 39 extends across the effluent end of each tank at the desired height, each tank discharging into the common well F which empties into the pipe G. In a similar manner the two wells 21, each of which is provided with the automatic valve 22 as shown in Fig. 2, may communicate with a single or common compartment 21ᵃ. The valves 22 at the bottoms of the two wells 21 act automatically and intermittently to dump cleaned grit from the wells 21 into the compartment 21ᵃ for storage and later commercial use.

Obviously those skilled in the art may make various changes in the details and arrangement of parts without departing from the spirit and scope of the invention as defined by the claims hereto appended, and I wish therefore not to be restricted to the precise construction herein disclosed.

Having thus shown and described an embodiment of my invention, what I desire to secure by Letters Patent of the United States is:

1. Apparatus for treating sewage and for separating solids from liquids comprising the combination with a stationary sedimentation tank, of a conveyor chain adapted to move through the tank, flights on the conveyor chain adapted to move settled solids laterally to and fro in the liquid from which they were settled to agitate the solids and to wash out therefrom entrapped flotant substances, and buckets on the conveyor chain adapted to remove the settled solids from the tank.

2. Sewage treating apparatus comprising the combination with a stationary sedimentation tank, of a conveyor chain adapted to move through the tank, flights on the conveyor chain adapted to move settled solids away from the center of the tank and towards the center, to effect thorough agitation of the solids in the liquid from which they were settled for washing from the solids entrapped flotant substances, buckets on the conveyor chain adapted to move the said settled solids through the tank and to remove them from the tank, mechanism for lifting the conveyor chain out of the tank, the said buckets being provided with drainage openings for drainage of liquid entrapped with the solids as the buckets move upwardly from the tank, a drip trough adjacent the path of travel of the buckets for guiding liquid drained from the buckets, means for tilting the buckets to dumping position incident to the buckets completing their upward travel, a trough for receiving the materials discharged from the buckets, the buckets pushing the discharged material through the trough until a point of disposal is reached, and means for returning the buckets to operative position incident to their returning to the tank.

3. In sewage disposal apparatus, the combination with a settling tank, of means for introducing grit containing sewage into said tank under conditions favoring the settling of such grit to the bottom of said tank, mechanism for agitating the settled grit at the bottom of said tank to separate therefrom organic materials clinging thereto, and removing the cleaned grit from the tank, a hopper for receiving the discharged grit from said removing mechanism, and automatic means operated by the weight of the grit in said hopper for emptying said hopper intermittently.

4. In a sewage disposal apparatus, the combination with a settling tank, of supporting rails adjacent the sides thereof, a plurality of flight supports extending laterally of said tank and resting on said rails, a pair of angularly disposed flights carried adjacent the center portion of one of said flight supports, a pair of angularly disposed flights carried adjacent the end portions of another of said flight supports, a material removing flight carried by still another of said flight supports, and means for moving said flight supports longitudinally of said tank.

5. In a sewage disposal apparatus, the combination with a settling tank, of supporting rails adjacent the sides thereof, a plurality of flight supports extending laterally of said tank and resting on said rails, a pair of angularly disposed flights carried adjacent the center portion of one of said flight supports, a pair of angularly disposed flights carried adjacent the end portions of another of said flight supports, and means for moving said flight supports longitudinally of said tank.

6. In a sewage disposal apparatus, the combination with a settling tank, of supporting rails adjacent the sides thereof, a plurality of flight supports extending laterally of said tank and resting on said rails, a pair of angularly disposed flights carried by one of said flight supports comprising means adapted to move settled material laterally outward from the center of said tank, a pair of angularly disposed flights carried by another of said flight supports comprising means adapted to move said settled material laterally inward from the sides of said tank, a flight carried by still another of said flight supports comprising means adapted to remove material from said tank, and means for moving said flight supports longitudinally of said tank.

7. In a sewage disposal apparatus, the combination with a settling tank, of supporting rails adjacent the sides thereof, a plurality of flight supports extending laterally of said tank and resting on said rails, a pair of angularly disposed flights carried by one of said flight supports comprising means adapted to move settled material laterally outward from the center of said tank, a pair of angularly disposed flights carried by another of said flight supports comprising means adapted to move said settled material laterally inward from the sides of said tank, and means for moving said flight supports longitudinally of said tank.

8. In a sewage disposal apparatus, the combination with a settling tank, of an influent inlet at one end thereof and an effluent outlet at the other end thereof, endless conveyor means having an upper run and a lower run, said lower run being positioned within the tank and the upper run being positioned outside the tank, angularly disposed agitation flights carried by said conveyor means, material gathering buckets carried by said conveyor means, and means for driving said conveyor means with the direction of travel of said buckets opposite to the direction of flow of the liquid through said tank.

9. In a sewage disposal apparatus, the combination with a settling tank, of a conveyor extending within said tank comprising a plurality of flight supports extending laterally of said tank, angularly disposed flights carried by one of said flight supports comprising means adapted to move settled material laterally outwardly toward the sides of said tank, angularly disposed flights carried by another of said flight supports comprising means adapted to move settled material laterally inwardly from the sides of said tank, flights carried by still another of said flight supports comprising means adapted to move settled material longitudinally of said tank, and means for operating said conveyor to move said flight supports longitudinally of said tank.

10. In a sewage disposal apparatus, the combination with a settling tank, of a conveyor extending within said tank comprising a plurality of flight supports extending laterally of said tank, angularly disposed flights carried by one of said flight supports comprising means adapted to move settled material laterally outwardly toward the sides of said tank, angularly disposed flights carried by another of said flight supports comprising means adapted to move settled material laterally inwardly from the sides of said tank, and means for operating said conveyor to move said flight supports longitudinally of said tank.

11. In a sewage disposal apparatus, the combination with a settling tank, of a conveyor extending within said tank comprising means adapted to move settled material laterally outwardly toward the sides of said tank, means adapted to move material laterally inwardly from the sides of said tank, means adapted to move material longitudinally of said tank, and means for driving said conveyor.

12. Sewage disposal apparatus comprising the combination with a tank having a substantially horizontal bottom and an inclined end, a conveyor operating through the tank and up the inclined end, and an intake opening laterally into the tank at the end thereof adjacent said inclined end and above said horizontal bottom to enable all heavy solid materials to be deposited in the path of travel of the conveyor.

13. In sewage disposal apparatus, the combination with a settling tank, of supporting rails adjacent the sides thereof, a plurality of flight supports extending laterally of said tank and resting on said rails, a pair of angularly disposed flights carried adjacent the center portion of one of said flight supports, a pair of angularly disposed flights carried adjacent the end portions of another of said flight supports, a material receiving bucket flight carried by still another of said flight supports, and means for moving said flight supports longitudinally of said tank.

14. In a sewage disposal apparatus, the combination with a settling tank, of supporting rails adjacent the sides thereof, a plurality of flight supports extending laterally of said tank and resting on said rails, angularly disposed flights carried by one of said flight supports comprising means adapted to move settled material laterally outward from the center of said tank, angularly disposed flights carried by another of said flight supports comprising means adapted to move said settled material laterally inward from the sides of said tank, a bucket flight carried by still another of said flight supports and comprising means adapted to remove material from said tank, and means for moving said flight supports longitudinally of said tank.

15. In sewage disposal apparatus, the combination with a settling tank, of endless conveyor apparatus adapted to move in said tank with its lower run adjacent the tank bottom and including, means including angularly disposed flights for moving settled material laterally inwardly toward the center of said tank, means including angularly disposed flights for moving settled material laterally outwardly from the center of said tank, bucket means for collecting settled solids; and means for operating said endless conveyor apparatus.

ROBERT E. BRIGGS.